United States Patent [19]

Kirigaya et al.

[11] Patent Number: 4,705,375
[45] Date of Patent: Nov. 10, 1987

[54] PAIR OF LIGHT SHIELDING FILM CASES FOR SURVEILLANCE CAMERA

[75] Inventors: Tadayuki Kirigaya; Ichiro Taguchi, both of Tokyo, Japan

[73] Assignee: Asahi Kogaku Kogyo Kabushiki Kaisha, Tokyo, Japan

[21] Appl. No.: 849,623

[22] Filed: Apr. 9, 1986

[51] Int. Cl.⁴ .............................................. G03B 17/26
[52] U.S. Cl. .................................. 354/275; 352/78 R; 242/71.1
[58] Field of Search .................... 354/275; 352/78 R; 242/71.1, 71.3, 71.7

[56] References Cited

U.S. PATENT DOCUMENTS

| | | | |
|---|---|---|---|
| 1,664,730 | 4/1928 | Beidler | 242/71.1 |
| 2,469,008 | 5/1949 | Simmon et al. | 242/71.1 |
| 3,479,112 | 11/1969 | Lester | 352/78 R |
| 3,773,409 | 11/1973 | Pfeifer et al. | 352/78 R |
| 4,146,321 | 3/1979 | Melillo | 354/275 |
| 4,221,479 | 9/1980 | Harvey | 354/275 |
| 4,281,913 | 8/1981 | Shono et al. | 352/78 R |

Primary Examiner—A. A. Mathews
Attorney, Agent, or Firm—Sughrue, Mion, Zinn, Macpeak & Seas

[57] ABSTRACT

A pair of light-shielding film cases of similar construction, such as may be used in a surveillance camera, having a simple construction but providing improved film running performance. The light-shielding film cases accommodate a film supplying spool on which a film has been wound and a film winding spool on which the film is taken up. At least one roller is provided in each of the film cases. The film cases each have a cover and a winding knob, the latter also serving as a spool bearing and being mounted on a respective one of the covers.

4 Claims, 5 Drawing Figures

PAIR OF LIGHT SHIELDING FILM CASES FOR SURVEILLANCE CAMERA

BACKGROUND OF THE INVENTION

The present invention relates to a film magazine for use mainly for a surveillance camera such as may be used in crime prevention, and more particularly to a pair of light-shielding film cases of similar configuration which accommodate a film supplying spool and a film winding spool, respectively.

In general, a surveillance camera uses a film supplying spool and a film winding spool, that is, a spool on which unexposed film has been wound and an empty spool are loaded on the film supplying side and the film winding side of the camera using light-shielding members.

The light-shielding member may be a pair of light-shielding cases of similar configuration which accommodate a film supplying spool and a film winding spool, respectively. The film cases may be of the same construction as a 135 film cartridge (JIS K7519) or a 70 mm film magazine. Conventional film cases used in a surveillance camera will be described with reference to FIGS. 1 and 2.

A film supplying light-shielding film case 40 has a film case body 41 and a cover 42 detachably mounted on the film case body 41, and a film winding light-shielding film case 50 includes a film case body 51 and a cover 52 which are similar in configuration to the film case body 41 and the cover 42 of the film supplying light-shielding film 40 and 50, respectively. The spools 43 and 53 have respective square holes 44 and 54 at their center which are engaged wth the film winding shafts 45 and 55 of the camera 61 to run the film 62. A picture is taken with a lens 63 with the film set between a rail surface 64 and a pressure plate 65.

In the camera thus constructed, the film 62, after passing through a light-shielding member 56, is abruptly bent and wound on the spool 53 in the film winding light-shielding film case 50, as a result of which the film 62 is greatly strained. Accordingly, the camera suffers from the difficulties that the winding torque is high, the film is easily scratched or damaged, and the film can be unintentionally exposed to light.

In order to join the film case bodies 41 and 51 and the covers 42 and 52, it is necessary to use some fixing arrangement. Furthermore, in order to mount the light-shielding film cases 40 and 50 on the camera, it is necessary to provide a positioning member on the camera. Moreover, in order to stretch the film tight in the cases, it is necessary to additionally provide a winding member.

An object of this invention is to eliminate the above-described difficulties. More specifically, an object of the invention is to provide a pair of lightshielding film cases similar in configuration to each other which are simple in construction and which accommodate a respective film supplying spool and a film winding spool.

SUMMARY OF THE INVENTION

In accordance with the above and other objects, in a pair of light-shielding film cases for a surveillance camera constructed according to the invention, at least one roller is provided in each of the film case bodies, positioning pin-shaped legs are formed on the bottoms of the film case bodies, and covers for the film case bodies are provided with screws for fixing the covers to the film case bodies and winding knobs which serve also as spool bearings.

DESCRIPTION OF THE PREFERRED EMBODIMENTS

The invention will be described with reference to a preferred embodiment thereof shown in FIGS. 3 through 5.

Figure 1:
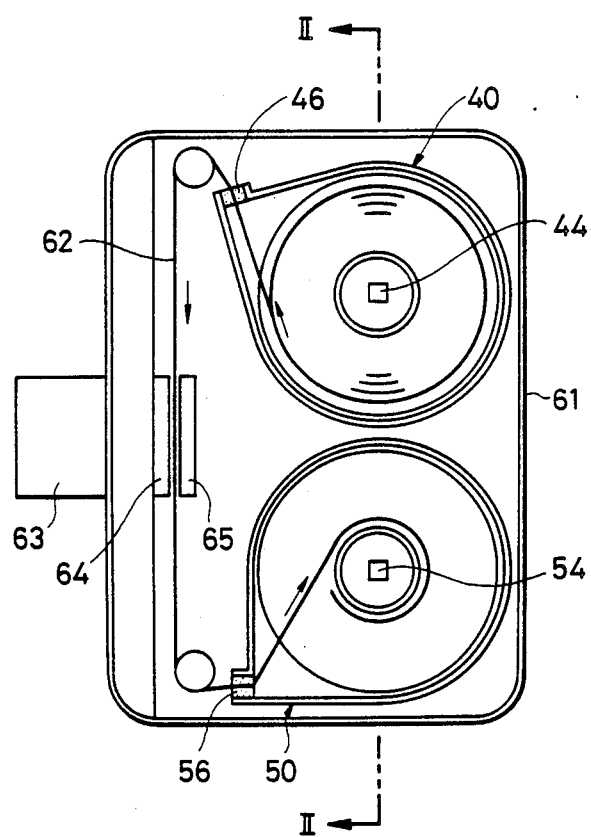
FIG. 1 is a front view showing a pair of conventional light shielding film cases.
Figure 2:
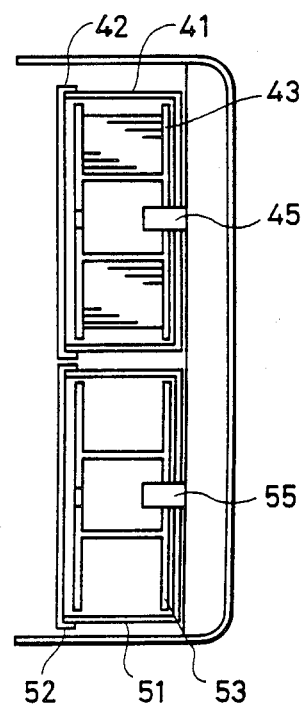
FIG. 2 is a sectional view taken along a line II—II in FIG. 1.
Figure 3:
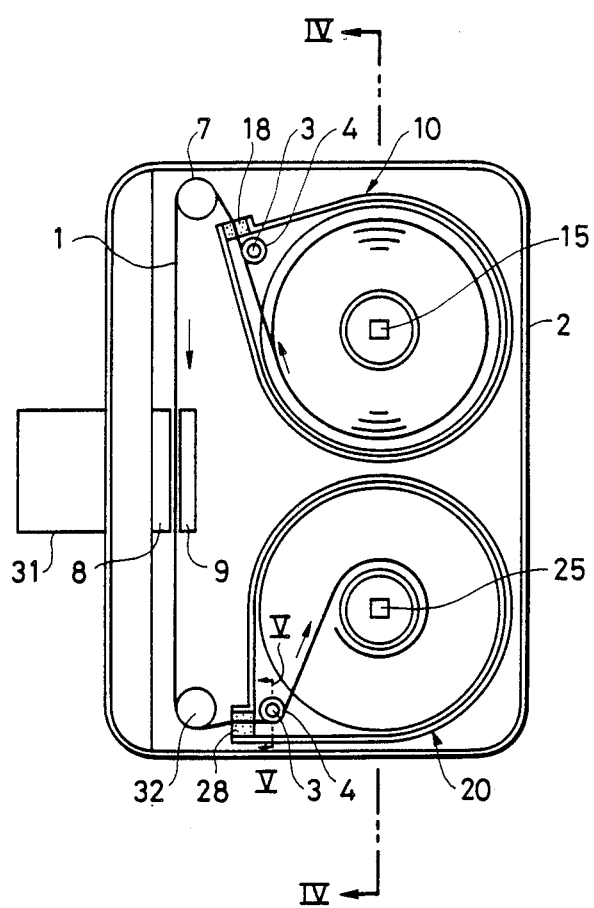
FIG. 3 is a front view showing a pair of light shielding film cases according to the invention.
Figure 4:
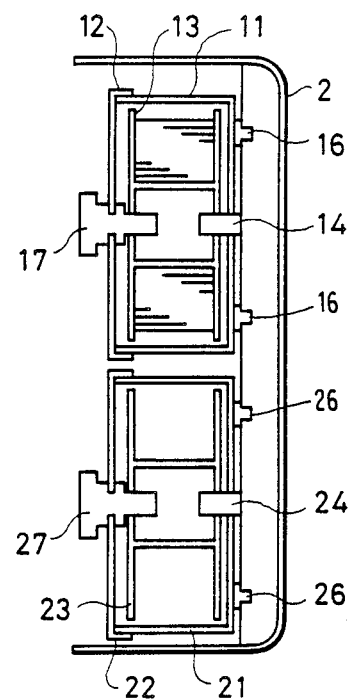
FIG. 4 is a sectional view taken along a line IV—IV in FIG. 3.
Figure 5:
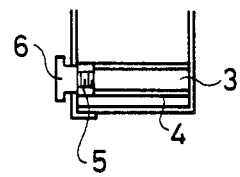
FIG. 5 is a front view taken along a line V—V in FIG. 3.

As shown in FIGS. 3 through 5, a film supplying case 10 and a film winding case 20 are similar in configuration to each other. The film supplying case 10 includes a first case body 11 and a cover 12 detachably mounted on the case body 11. Similarly, the film winding case 20 has a second case body 21 and a cover 22 detachably mounted on the case body 21. The film supplying case 10 accommodates a film supplying spool 13 on which film 1 (not exposed) is wound, while the film winding case 20 accommodates a film winding spool 23 on which one end portion of the film 1 is wound.

The film winding shafts 14 and 24 of a camera 2 penetrate the bottoms of the case bodies 11 and 21 and engage with respective square holes 15 and 25 formed in the spools 13 and 23. The case bodies 11 and 21 have a plurality of legs 16 and therfor 26 on their respective bottoms. The legs 16 and 26 are engaged with recesses formed in the camera 2. The same effects can be obtained by forming recesses in the legs and by providing protrusions on the camera.

In each of the case bodies 11 and 21, a roller 4 is provided which is rotatably fitted on a roller shaft 3. The roller shaft 3 has a female-threaded part 5 at one end.

Winding knobs 17 and 27 are rotatably mounted on the covers 11 and 21, respectively. The ends of the knobs 17 and 27 are engaged with the square holes 15 and 25 of the spools 13 and 23, respectively.

Each of the covers 12 and 22 has a fixing screw 6. The fixing screws 6 are threadably engaged with the female-threaded parts 5 of the roller shafts 3 to fix the case bodies 11 and 21 to the covers 12 and 22, respectively.

By arranging the legs 16 and 26 on the case bodies 11 and 22 at irregular intervals, the light shielding film cases 10 and 20 can be held in place on the camera body 2 at all times. A fixing device (not shown) is provided to secure the light-shielding film cases 10 and 20 to the camera body 2.

The film supplying spool 13 and the film winding spool 23 are stably and rotatably supported in the light shielding film cases 10 and 20 by means of the film winding shafts 14 and 24 and the winding knobs 17 and 27, respectively.

The unexposed film 1 from the film supplying light-shielding film case 10 is passed through a light-shielding member 18 while being kept in contact with the roller 4, and run to the gap between a rail plate 8 and a pressure plate 9 while being guided by a camera roller. After a picture is taken with the lens 31 of the camera, the film 1 passes through another light-shielding member 28 while being guided by a camera roller 32 and run into the film winding light-shielding film case 20 where the exposed film is wound on the spool 23 while being kept in contact with the roller 4.

As described above, rollers are provided in the light-shielding film cases of the invention. Therefore, the film is run smoothly; that is, the above-described difficulties such as scratching of the film and light leakage are eliminated.

Furthermore, as the winding knobs, which serve also as bearings, are provided on the covers, the film can be stably run. The roller shafts, which are simple in construction, shield the film cases from light without having to provide fixing members.

As the legs are arranged irregularly on the case bodies, the positional relationship between the camera and the film cases is fixed. Accordingly, the difficulty of the operator erroneously loading the film cases in the camera is prevented.

We claim:

1. A pair of light-shielding film cases for a surveillance camera which are similar in configuration to each other and disposed adjacent one another in said camera, comprising:
   a film supplying spool on which a film has been wound, said film supplying spool being accomodated within a first case body having a first cover;
   a film winding spool on which said film, supplied from said film supplying spool, is wound, said film winding spool being accomodated within a second case body having a second cover;
   at least one smooth roller rotatably fitted on a roller shaft and provided in each of said film cases;
   a light-shielding member disposed in outlets of each said case body; and
   a winding knob rotatably mounted on a respective one of said covers and serving as a spool bearing;
   wherein film is passed through said light-shielding member while being kept in contact with said roller.

2. The pair of light-shielding film cases as claimed in claim 1, further comprising protrusions formed on bottom surfaces of said film cases for engagement with recesses formed in said camera to secure said film cases.

3. The pair of light-shielding film cases as claimed in claim 1, wherein each said roller shaft further comprises securing means on one end thereof, and each said cover having fixing means cooperating with said securing means to secure said cover to said respective case body and support said one end of said roller shaft.

4. The pair of light-shielding film cases as claimed in claim 3, wherein the securing means comprises female screw threads on said one end of each roller shaft and said fixing means comprises a fixing screw attached to said cover and cooperating with said screw threads.

* * * * *